United States Patent
Foret

(10) Patent No.: US 9,249,702 B2
(45) Date of Patent: *Feb. 2, 2016

(54) DEVICE WITH LUBRICANT PROTECTION ARRANGEMENT AND LUBRICATING METHOD

(75) Inventor: Pierre Foret, Munich (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/477,120

(22) Filed: May 22, 2012

(65) Prior Publication Data

US 2013/0126273 A1 May 23, 2013

(30) Foreign Application Priority Data

May 26, 2011 (DE) .................. 10 2011 102 536

(51) Int. Cl.
| | |
|---|---|
| *F01M 9/12* | (2006.01) |
| *F01M 9/02* | (2006.01) |
| *F01M 5/00* | (2006.01) |
| *F16H 57/04* | (2010.01) |

(52) U.S. Cl.
CPC .............. *F01M 9/12* (2013.01); *F01M 5/001* (2013.01); *F01M 9/02* (2013.01); *F16H 57/0452* (2013.01)

(58) Field of Classification Search
CPC .............. F16N 7/30; F16N 7/32; F16N 7/34; F01M 9/12; F01M 9/02; F01M 5/001; F16H 57/0452

USPC .................................................. 184/104.1, 14
See application file for complete search history.

(56) References Cited

U.S. PATENT DOCUMENTS

| | | | | | |
|---|---|---|---|---|---|
| 1,761,930 | A | * | 6/1930 | McCuen | 210/167.04 |
| 2,888,913 | A | * | 6/1959 | Emmett | F01M 9/02 123/1 R |
| 3,857,363 | A | * | 12/1974 | Ferlito | 118/300 |
| 4,887,651 | A | * | 12/1989 | Santiago | 141/1 |
| 5,327,998 | A | * | 7/1994 | Rosado et al. | 184/55.1 |
| 5,513,722 | A | * | 5/1996 | Foltz | 184/55.2 |
| 5,570,813 | A | * | 11/1996 | Clark, II | 222/1 |
| 5,636,708 | A | * | 6/1997 | Wedeven et al. | 184/6.22 |
| 5,715,912 | A | * | 2/1998 | Maxwell et al. | 184/6.26 |
| 6,293,263 | B1 | * | 9/2001 | Middlebrook | 123/559.1 |
| 6,299,690 | B1 | * | 10/2001 | Mongeon et al. | 118/622 |
| 2001/0037788 | A1 | * | 11/2001 | Okuda et al. | 123/195 C |
| 2004/0069570 | A1 | * | 4/2004 | Baumann | 184/55.1 |
| 2010/0258380 | A1 | * | 10/2010 | Vervaet et al. | 184/6.26 |
| 2013/0126273 | A1 | * | 5/2013 | Foret | 184/104.1 |

* cited by examiner

*Primary Examiner* — William A Rivera
*Assistant Examiner* — Michael Riegelman
(74) *Attorney, Agent, or Firm* — Joshua L. Cohen

(57) ABSTRACT

A device provides lubricant protection and includes at least two friction members, at least one lubricant reservoir for a lubricant arranged in the device, and at least one lubricant protection arrangement having flow means for enabling a lubricant protection gas to flow through the lubricant in the lubricant reservoir and the device. A method is also provided.

9 Claims, 1 Drawing Sheet

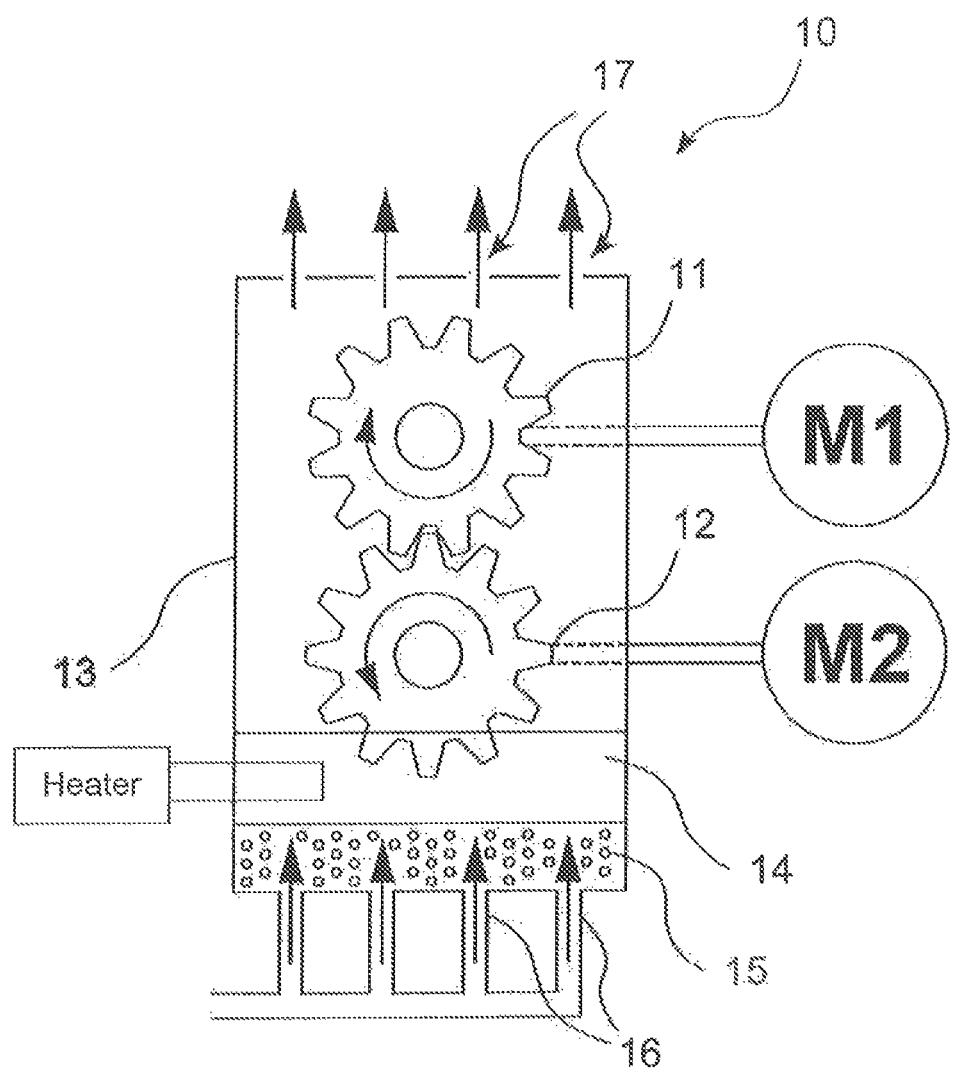

DEVICE WITH LUBRICANT PROTECTION ARRANGEMENT AND LUBRICATING METHOD

BACKGROUND OF THE INVENTION

The present invention pertains to a device to be lubricated with a lubricant protection arrangement, as well as to a corresponding lubricating method.

The lubrication of machine elements with lubricants such as different types of grease, oil or solid lubricant fulfills different functions. On the one hand, it serves for preventing or reducing wear phenomena at contact points between so-called friction partners, for diminishing stress concentrations, for example, in rolling bearings and for reducing additional frictional shearing stresses on surfaces. Lubricants are furthermore used for corrosion protection and for cooling machine elements if a sufficient lubricant exchange and therefore a corresponding dissipation of heat can be ensured.

The objective of lubrication consists of separating contacting surfaces of the friction partners by means of a hydrodynamic liquid film or a protective reaction layer. In the hydrodynamic formation of lubricating films, an elastic deformation frequently also plays an important role such that one refers to so-called elastohydrodynamic lubrication in this case. The main objective of lubrication is a complete separation of the friction partners. This can be achieved with a suitable combination of the lubricant viscosity, the moving speed of the friction partners and the contact pressure, as well as corresponding constructive adaptations.

As mentioned above, different types of lubricating oil, lubricating grease and solid lubricant are used as lubricants. This application mainly focuses on liquid lubricants such as, e.g., lubricating oils. Important parameters of lubricating oils that can be influenced are the density, the viscosity index, the shear stability, the so-called Cloud-and-Pour point, the neutralization capacity, the neutralization value, the total base number and the flash point. Furthermore, the thermal capacity, the air absorption capacity and the content of water and foreign matter influence the properties of a lubricating oil.

Various types of lubricating oil additives are known for modifying tribologically relevant lubricating oil properties, for example, the viscosity/temperature behavior and/or the frictional and wear behavior, as well as for improving the oxidation resistance or the prevention of foaming.

Additives may be added to lubricating oil in the form of commercially available so-called additive packets. In modern motor oils, 10 to 20% of the overall volume consists of additives. Polymeric additives typically form another 3% of the overall volume.

The service life of lubricating oils is limited. Due to interactions with the system to be lubricated and the surrounding atmosphere, the service life of the lubricating oil and of the entire tribological system can be significantly reduced. In this context, oxidation processes that lead to an increase of the neutralization value and therefore an increased corrosiveness of the lubricating oil are considered particularly critical. An increase of the viscosity causes the tribological properties of the system to change over time. Deposits formed due to corrosion by separating lubricating oil components can cause blockages. A loss of additives can result in certain components of the lubricating oil no longer being sufficiently protected such that its quality deteriorates. Consequently, frequent oil changes or maintenance intervals are required.

It would therefore be desirable to increase the service life of a lubricating oil or, more generally, a liquid lubricant, particularly a lubricating oil that is based on minimal oil.

SUMMARY OF THE INVENTION

Based on these circumstances, the present invention discloses a device to be lubricated with a lubricant protection arrangement, as well as a corresponding lubricating method.

The invention proposes a device with at least two friction partners to be lubricated and at least one lubricant reservoir for a lubricant arranged in the device, wherein at least one lubricant protection arrangement is provided that comprises means for enabling a lubricant protection gas to flow through the lubricant and the lubricant reservoir.

Not only the lubricant reservoir, but also the device itself is designed for the flow-through of a lubricant protection gas. In this way, a suitable lubricant atmosphere, e.g., in the form of an oxygen-free aerosol, can be continuously or intermittently provided or regenerated in the device to be lubricated such that particularly effective protection is achieved.

BRIEF DESCRIPTION OF THE DRAWING

The FIGURE shows a device according to an embodiment of the invention.

DETAILED DESCRIPTION OF THE INVENTION

In the context of this application, a "lubricant protection gas" refers to a gas that causes a prolonged lubricant service life and/or improved lubricant properties due to its physical and/or chemical properties, e.g., due to its inertness. Such a lubricant protection gas preferably comprises inert gases such as, for example, nitrogen and carbon dioxide and/or rare gases such as argon. However, gases such as carbon monoxide or acetylene are also suitable. A lubricant protection gas preferably is oxygen-free in order to prevent oxidation of lubricant components. The lubricant protection gas preferably is also free of other corrosive components, particularly water and abradant particles.

In the context of the present invention, the term "oxygen-free" lubricant protection gas also refers to a gas that still contains slight (residual) contents of dissolved oxygen or is able to produce slight amounts of oxygen. Although it is desirable that the lubricant protection gas is completely oxygen-free, this is usually associated with significant additional costs.

Methods for removing oxygen, for example, from corresponding gases are sufficiently known. For example, oxygen can be condensated out of air in a cooling trap or catalytically separated. Inert gases such as argon, nitrogen or carbon dioxide may also be provided in liquid, oxygen-free form and transferred into the gaseous phase prior to the utilization in a lubricant protection gas.

The inventive measures make it possible to create an oxygen-free lubricant/gas system in a device to be lubricated that is permanently available in said device and significantly prolongs the service life of frictional components. Consequently, the maintenance intervals of corresponding systems can be significantly extended such that higher availability and/or lower maintenance costs are achieved. Due to a corresponding oxygen-free lubricant atmosphere, it is also possible to utilize oxygen-sensitive lubricant additives without having to carry out a frequent lubricant change.

A lubricant protection arrangement that not only comprises a supply line for the lubricant protection gas, but also means for enabling the lubricant protection gas to bubble into the lubricant is considered particularly advantageous. This may be realized, for example, with a gas bubbling device for producing gas bubbles that flow through the lubricant and during this process produce an aerosol and/or a lubricant mist. The gas bubbles may be produced, for example, by a filter (membrane or frit), wherein the gas bubble size is influenced with the respective pore size. The bubbling of the lubricant protection gas and therefore the production of the lubricant/gas system may, as mentioned above, take place continuously or intermittently, e.g., in lubricating intervals. Continuous bubbling guarantees a lubricant/gas system with constant properties while intermittent bubbling saves lubricant protection gas.

In the context of the present invention, an "aerosol" refers to any system, in which a liquid lubricant is present in a gaseous carrier fluid, e.g., in the form of droplets. The respective droplet size may significantly vary in this case and lie in the range between 0.5 nm and several 10 µm.

The device to be lubricated features outlet openings for the lubricant protection gas. In this case, the escaping lubricant protection gas can be subjected to a cleaning process (e.g., by means of filtration or chemical processing) and/or once again supplied to a lubricant protection arrangement. Consumed lubricant protection gas can be effectively discharged in this way.

There is also provided a lubricant protection arrangement that comprises a heating device for the lubricant and/or the lubricant protection gas. It is generally known that certain heated gases used as a lubricant protection gas such as, for example, acetylene or carbon monoxide positively influence the tribological properties of a system to be lubricated. It would therefore be possible to provide a correspondingly heated gas flow by means of a gas heater. Corresponding heating devices ensure that parameters of the lubricant and/or the lubricant protection gas such as, for example, its density, its viscosity and/or its compressibility can be controlled particularly well.

If applicable, it would also be possible to only transform a certain amount of the lubricant into the gaseous phase and to thusly produce an aerosol at an elevated temperature in the lubricant protection arrangement. If such a heated aerosol encounters (cooler) gear elements, liquid aerosol particles are deposited thereon due to condensation such that a purposeful lubrication can be achieved.

In the inventive lubricating method, a lubricant protection gas flows through the lubricant reservoir and the lubricant contained therein, as well as through the device itself, due to the utilization of the described lubricant protection arrangement.

As mentioned above, it is possible to utilize inert gases such as argon or nitrogen, as well as gases such as carbon dioxide, carbon monoxide and/or acetylene, that are known to positively influence the tribological properties of a system to be lubricated as lubricant protection gases in a corresponding method. Corresponding gas mixtures may also be utilized.

The lubricant used consists of a lubricant that is based on mineral oil, particularly a mineral oil with polymeric additives and/or additives. As already mentioned above, the improved protection of the lubricant achieved with the inventive measures also makes it possible to utilize polymeric additives that could not be used in conventional lubricating systems so far because they would have been subjected to the damaging oxidation effect of oxygen. However, the utilization of the invention also makes it possible, in particular, to eliminate certain additives such as, e.g., antioxidants such that significant cost advantages can be realized.

As mentioned above, a certain viscosity, density and/or compressibility of the lubricant and/or the lubricant protection gas can be adjusted in a corresponding method. This can be realized, for example, with a suitable gas composition and gas temperature and/or a suitable flow speed or with corresponding adjusted pressures.

The inventive method can be utilized in the number of devices to be lubricated such as, for example, turbines of wind power plants, engine parts, bearings, valves and valve drives, as well as cutting tools.

Other advantages and embodiments of the invention result from the description and the attached drawing Figure.

It goes without saying that the characteristics described above and below can be used in the respectively described combination, and also in other combinations or individually without deviating from the scope of the present invention.

An exemplary embodiment of the invention is schematically illustrated and described in greater detail below with reference to the drawing Figure.

The Figure shows a device according to an embodiment of the invention that is altogether identified by the reference symbol 10. The device 10 comprises at least two friction partners 11, 12 or members that are symbolized in the form of toothed wheels and driven by motors M1 and M2. The friction partners 11, 12 are accommodated in a housing 13 that is at least partially gas-tight and realized such that an inflowing lubricant protection gas is present in the housing 13 in a controlled quantity and/or this lubricant protection gas can flow through the housing with a controlled speed.

The device 10 features a lubricant reservoir 14, for example, in the form of a lubricant sump for an oil bath lubrication that is arranged on the bottom side of the housing 13. The friction partners 11, 12 may generally be partially or completely surrounded by the lubricant reservoir 14. On the bottom side of the lubricant reservoir, a bubbling device 15 is provided for bubbling a lubricant protection gas into the lubricant in the lubricant reservoir 14. The lubricant protection gas is supplied via supply lines 16. The bubbling device 15 includes a membrane and/or a frit, by means of which gas bubbles can be produced in the lubricant reservoir. A particularly large contact surface between the lubricant and the lubricant protection gas can be realized in this way.

In order to enable the lubricant protection gas to flow through the housing 13, outlet openings 17 for the lubricant protection gas are provided, for example, on the cover side of the housing 13 such that the lubricant protection gas can continuously escape through these outlet openings. The outlet openings 17 may also be realized such that they can be closed and/or controlled such that a constant and/or intermittent throughput of lubricant protection gas can be ensured.

Although the device 10 to be lubricated is illustrated in the Figure in the form of an oil bath lubrication device, in which one of the friction partners 12 is immersed in the lubricant reservoir 14, the device may also be designed for an aerosol lubrication if it is ensured that a corresponding aerosol is produced due to the bubbling of the lubricant protection gas into the lubricant in the lubricant reservoir 14. In the latter instance, the lubricant reservoir 14 may be continuously formed or supplied by the lubricant condensating out of the aerosol.

What is claimed is:

1. A device (10) comprising:
   at least two friction members (11, 12) to be lubricated by the device,
   at least one lubricant reservoir (14) for a lubricant, the at least one lubricant reservoir arranged as a sump within the device and at least partially surrounding the at least two friction members, and
   at least one lubricant protection arrangement disposed at and operatively associated with the at least one lubricant reservoir, the at least one lubricant protection arrangement comprising flow means (15, 16) and a lubricant protection gas able to flow through the lubricant in the lubricant reservoir and through the device, wherein the lubricant protection gas is oxygen-free and is selected from the group consisting of argon, nitrogen, carbon dioxide, carbon monoxide, acetylene, and a mixture of at least two of said gases.

2. The device according to claim 1, wherein the flow means comprises at least one supply line for the lubricant protection gas and a bubbling device for bubbling the lubricant protection gas into the lubricant reservoir.

3. The device according to claim 1, further comprising outlet openings (17) for the lubricant protection gas to flow through and escape the device.

4. A method for lubricating a device (10) including at least two friction members (11, 12) to be lubricated by the device, at least one lubricant reservoir (14) for a lubricant, the at least one lubricant reservoir arranged as a sump within the device, and through at least one lubricant protection arrangement disposed at and operatively associated with the at least one lubricant reservoir and which includes flow means (15, 16) for enabling a lubricant protection gas to flow through the lubricant in the lubricant reservoir and through the device, the method comprising:

at least partially surrounding the at least two friction members with the at least one lubricant reservoir, and flowing the lubricant protection gas through the lubricant reservoir (14) of the sump and through the device (10) for the lubricant protection gas to escape the device; wherein the lubricant protection gas is oxygen-free and is selected from the group consisting of argon, nitrogen, carbon dioxide, carbon monoxide, acetylene, and a mixture of at least two of said gases.

5. The method according to claim 4, wherein the flowing the lubricant protection gas is either continuous or intermittent through the lubricant reservoir and the device.

6. The method according to claim 4, wherein the lubricant is selected from the group consisting of a mineral oil, a mineral oil including polymeric additives, a mineral oil including other additives, and a mineral oil including polymeric and other additives.

7. The method according to claim 4, further comprising adjusting characteristics of at least one of the lubricant and the lubricant protection gas, the characteristics selected from the group consisting of temperature, density and compressibility of the lubricant and the lubricant protection gas.

8. The method according to claim 4, further comprising bubbling the lubricant protection gas into the lubricant reservoir.

9. The method according to claim 4, further comprising heating at least one of the lubricant and the lubricant protection gas.

* * * * *